A. NICOL.
AUTOMATIC TENSION REGULATOR FOR ELECTRICAL GENERATORS.
APPLICATION FILED JAN. 22, 1908.
910,949.
Patented Jan. 26, 1909.
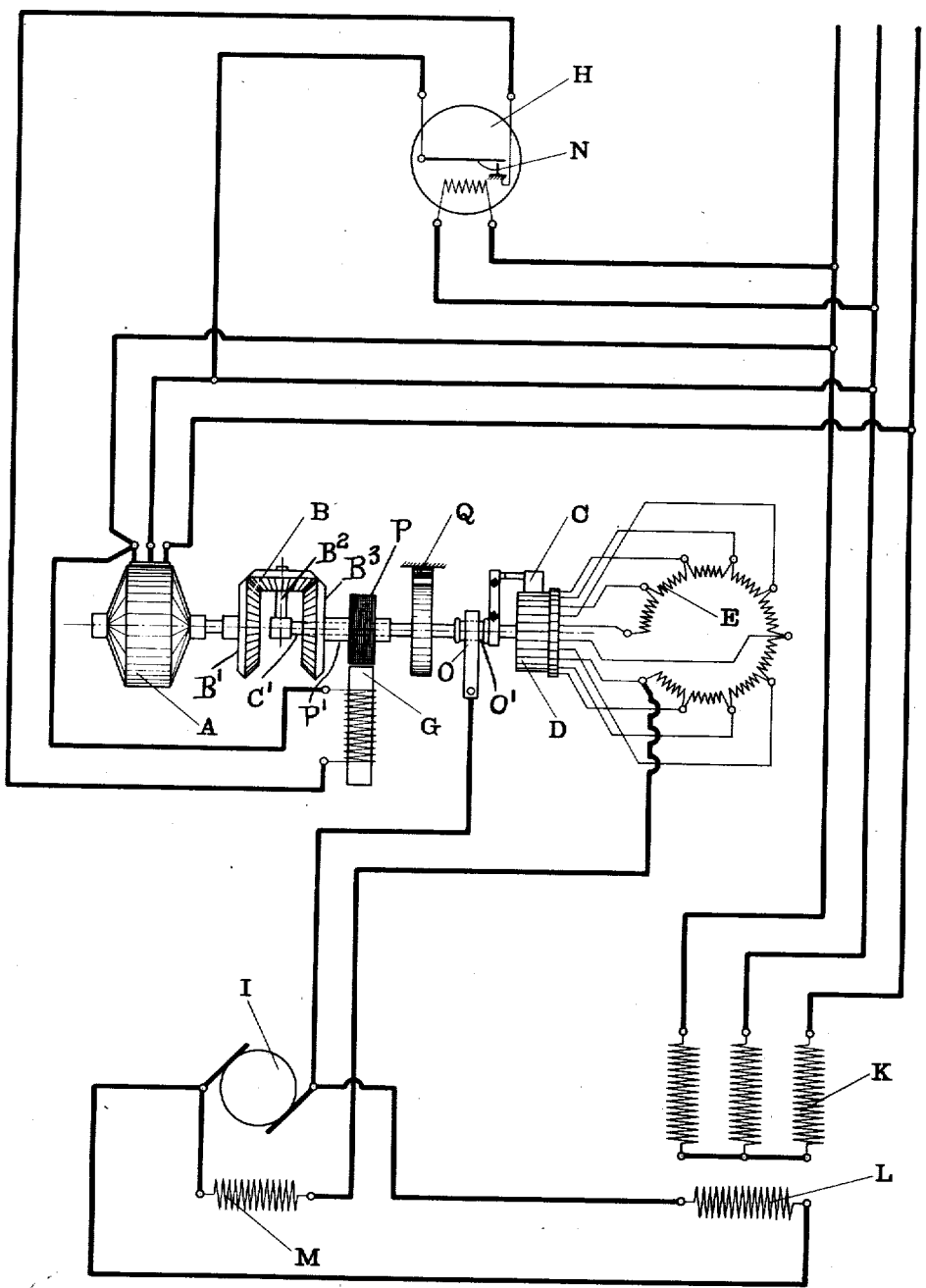

UNITED STATES PATENT OFFICE.

AUGUST NICOL, OF BERLIN, GERMANY, ASSIGNOR TO BERGMANN-ELEKTRICITATS-WERKE, AKTIENGESELLSCHAFT, OF BERLIN, GERMANY, A CORPORATION OF GERMANY.

AUTOMATIC TENSION-REGULATOR FOR ELECTRICAL GENERATORS.

No. 910,949.  Specification of Letters Patent.  Patented Jan. 26, 1909.

Application filed January 22, 1908. Serial No. 412,150.

*To all whom it may concern:*

Be it known that I, AUGUST NICOL, a subject of the German Emperor, and a resident of Berlin, in the Empire of Germany, have invented certain new and useful Improvements in Automatic Tension-Regulators for Electrical Generators, of which the following is a specification.

My invention relates to automatic tension regulators for electrical generators, particularly such as are operated in conjunction with a separate exciting generator. The regulation of the exciting current is accomplished, according to my present invention, by means of an auxiliary device operative intermittently to increase the tension in the exciting circuit and at the same time to accumulate energy which again reduces the tension in the exciting circuit when said device ceases to operate the adjuster. By these alternate increases and reductions the tension in the exciting circuit is regulated promptly and in a practically even or gradual manner.

The accompanying drawing illustrates in diagrammatic fashion one way of carrying out my invention.

A three-phase generator has its field magnet coils L connected with the armature coils of an exciting generator I. The field coil M of the exciting generator is included in a shunt circuit which also includes a potential-adjuster. This is shown as a rheostat E the several sections of which are connected with sections of a stationary commutator D engaged by a brush C of variable position. This brush is connected with one brush of the exciter I, through the medium of a contact strip or brush O, the other brush of the exciter being connected with one end of the coil M and the other end of this coil being connected with the terminal of the variable resistance E. From the armature coils K of the main generator the three line wires lead to the place of consumption. In a shunt from these line wires is located an auxiliary device consisting of a three-phase motor A. The shaft of this motor carries a bevel gear B' which meshes with a bevel wheel B mounted to turn on a radial stud B² secured to the same shaft C' which also carries the brush C and the contact ring O'. To this shaft is further secured one end of a coiled spring Q, the other end of which is fixed to a stationary support. This spring stores energy during the time that the potential-adjuster, or at least the brush C thereof, is operated by the motor A. The wheel B also meshes with a bevel gear B³ secured to a sleeve P' which is loose upon the shaft C' and carries a ring-shaped armature P. Adjacent to this armature is located an electromagnet G which, when energized, acts as a brake to oppose or prevent rotation of the armature P and its sleeve P'. The magnet G is included in an auxiliary shunt leading from two of the three wires connected with the motor A. In this auxiliary shunt is also included a switch N forming part of a voltmeter H, which has a shunt connection with two of the three line wires. This switch is so arranged that it will close the auxiliary shunt, to energize the magnet G, whenever the tension in the main circuit falls below a certain limit.

Should the voltage in the line wires drop on account of an increase in the load, the movable member or switch N of the voltmeter H will close the auxiliary shunt circuit through the magnet G. Previous to this, the gears B', B³, have been rotated idly in opposite directions, by the motor A, the wheel B rotating idly on the stationary stud B'. The spring Q has held the shaft C', brush C, and stud B², stationary. As soon as the magnet G is energized, the rotation of the gear B³ is stopped by the attraction of the said magnet on the armature P. The wheels B', B, B³, then form a planetary gearing of the well-known character, the shaft C' turning with one-half the velocity of the motor shaft. This causes the brush C to be shifted to adjust the tension in the coil M and thereby in the line wires. As soon as the proper voltage is restored in the line wires, the voltmeter switch N opens the circuit energizing the magnet G, so that the armature P is released. As soon as this occurs, the spring Q, which has been put under tension by the turning of the shaft C', uncoils and brings said shaft as well as the brush C and stud B², back to their normal position.

The fluctuations of potential which cause the switch N to open and close are very rapid so that the forward and backward rocking movements of the shaft C' will follow each other at very brief intervals. The amount of these fluctuations will be very slight, so that a practically constant tension is obtained, if the parts are properly dimensioned. On account of the practically uninterrupted regulation the apparatus will respond immediately to even slight variations of the load. In the particular case illustrated, I effect the regulation by varying the current which passes through the field coil M of the exciting generator I. It will be obvious that I might obtain the same result in various other ways, current which flows through the field coil L of the main generator, or by varying both currents at the same time.

I claim:—

1. A potential regulator comprising a constantly operated auxiliary device, a potential-adjuster, mechanism for connecting the said device with said adjuster in such a manner as to increase the potential, a switch which, according to the decrease or increase of potential throws said mechanism into or out of action, and means for storing energy while said adjuster is operated by said device, such stored energy operating the said adjuster for a reduction of potential when said mechanism is out of action.

2. A potential regulator comprising a constantly operated motor, a potential-adjuster, mechanism for connecting said motor with said adjuster in such a manner as to increase the potential, a switch which, according to the decrease or increase of potential, throws said mechanism automatically into or out of action, and means for storing energy while said adjuster is operated by the motor, such stored energy operating the said adjuster for a reduction of potential when said mechanism is out of action.

3. A potential regulator comprising a constantly operated motor, a potential-adjuster, planetary gearing for connecting the motor with the adjuster in such a manner as to increase the potential, an actuating device, which, according to the decrease or increase of potential effects an operative connection of the motor with said adjuster through the planetary gearing, or a release of the adjuster, and means for storing energy while said adjuster is being operated by the motor, said stored energy operating the adjuster to decrease the potential, when said adjuster is released.

4. A potential regulator comprising a constantly operated auxiliary device, a potential-adjuster, mechanism for connecting said device with the adjuster in such a manner as to increase the potential, an actuator which, according to the decrease or increase of potential effects an operative connection of said device with the adjuster through the said mechanism, or a release of the adjuster, and a spring which is put under tension while the adjuster is operated by said device, and which upon the release of the adjuster operates the latter to reduce the potential.

5. A potential regulator comprising a constantly operated motor, planetary gearing driven thereby, a potential-adjuster connected with said gearing, means, controlled by a decrease or increase of potential, for arresting or releasing a member of said planetary gearing, and mechanism for storing energy while said adjuster is operated by the motor, such stored energy operating the adjuster with opposite effect after its release from the motor.

6. A potential regulator comprising a constantly operated motor, planetary gearing driven thereby, a potential-adjuster connected with said gearing, a mechanical, magnetic, or eddy current brake, controlled by a decrease or increase of potential, for arresting or releasing a member of said planetary gearing, and mechanism for storing energy while said adjuster is operated by the motor, such stored energy operating the adjuster with opposite effect after its release from the motor.

7. A potential regulator comprising a constantly operated motor, planetary gearing comprising three members, one of which is driven by said motor, means controlled by a decrease or increase of potential, for arresting or releasing another member of the planetary gearing, a potential-adjuster connected with the third member of said gearing, and mechanism for storing energy while said adjuster is operated by the motor, such stored energy operating the adjuster with opposite effect after its release from the motor.

8. A potential regulator comprising a constantly operated motor, planetary gearing comprising three members, one of which is driven by said motor, means controlled by a decrease or increase of potential, for arresting or releasing another member of the planetary gearing, a potential-adjuster connected with the third member of said gearing, and mechanism for effecting a return movement of the adjuster after its release from the motor.

9. The combination with a main generator and an auxiliary generator for exciting the field coils of the main generator, of a potential-adjuster in operative connection with the auxiliary generator, a permanently driven device, means, controlled by variations of potential in the main circuit, for connecting the said adjuster with said device, or releasing it therefrom, and spring mechanism for effecting a return movement of the adjuster after its release from said device.

10. The combination with a main generator and an auxiliary generator for exciting the field coils of the main generator, of a potential-adjuster in operative connection with the auxiliary generator, a permanently driven device, means controlled by variations of potential in the main circuit, for connecting the said adjuster with said device, or releasing it therefrom, and mechanism for storing energy while the adjuster is operated by said device, such stored energy operating the adjuster with opposite effect after its release from said device.

In testimony whereof, I have hereunto set my hand this 4th day of January, 1908, in the presence of two subscribing witnesses.

AUGUST NICOL.

Witnesses:
 HENRY HASPER,
 WOLDEMAR HAUPT.